J. F. McKIM.
HUTCH.
APPLICATION FILED JUNE 11, 1920.

1,422,283.

Patented July 11, 1922.

INVENTOR
John F. McKim
BY John A. Naismith
ATTORNEY

UNITED STATES PATENT OFFICE.

JOHN F. McKIM, OF SAN JOSE, CALIFORNIA.

HUTCH.

1,422,283. Specification of Letters Patent. Patented July 11, 1922.

Application filed June 11, 1920. Serial No. 388,145.

*To all whom it may concern:*

Be it known that I, JOHN F. McKIM, a citizen of the United States, and resident of San Jose, in the county of Santa Clara and State of California, have invented certain new and useful Improvements in Hutches, of which the following is a specification.

My invention relates particularly to a novel hopper arrangement for rabbit and cavy hutches, and it is the object of my invention to provide a means for supplying the animals with cured feed in a perfectly sanitary manner.

Figure 1:
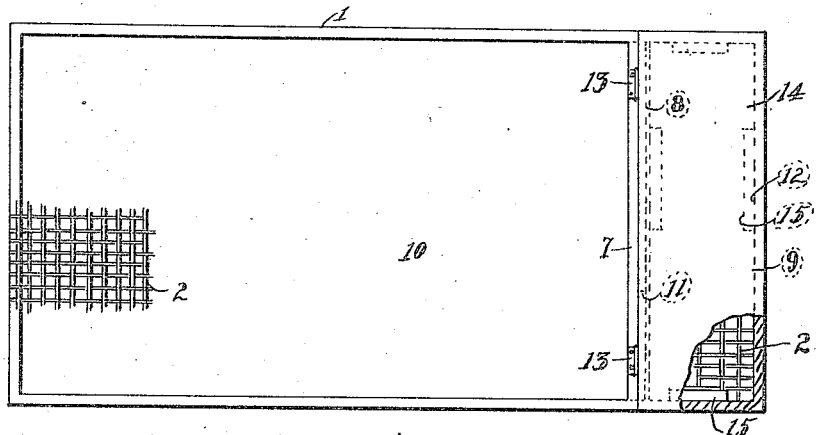
Figure 1 is a plan view of my improved hutch, part broken away.
Figure 2:
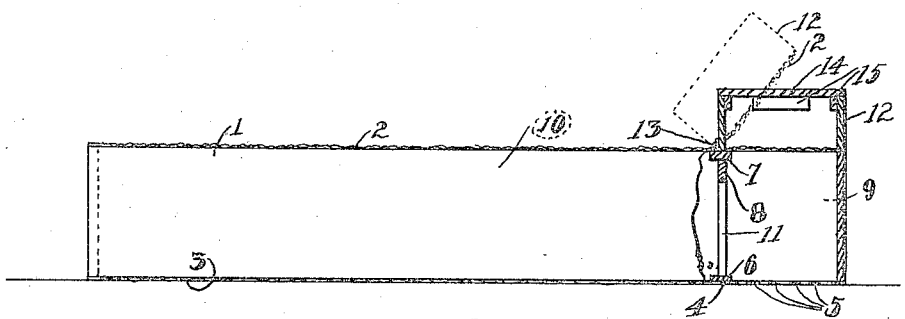
Figure 2 is a side elevation of the same, partly in section.

Referring more particularly to the drawing, 1 indicates a rectangular frame consisting of solid sides and ends and covered with a wire mesh 2 on one side, and wire mesh 3 on the other side extending to a point 4 near one end, the balance of this side being closed with spaced lath as 5. At 6 is shown a cross strip placed at the juncture of wire mesh 3 and lath 5, another cross strip 7 being placed on the opposite side as shown and the two strips being connected by a partition 8 forming, with the adjacent end portion of the frame, a compartment 9 communicating with the larger compartment or yard 10 by means of a passage 11 in partition 8.

At 12 is shown a hopper of substantially the same lateral dimensions as compartment 9 and arranged thereover and hinged to strip 7 as at 13. The wire mesh 3 over this portion of the frame is secured to the lower edge of the hopper 12 so as to be raised therewith, and the upper side of the hopper is fitted with a removable cover 14 provided with blocks 15 to hold the same in position when placed over hopper 12.

In its practical application the device may be easily moved about from place to place and placed over plots of growing edible green stuff. The screened bottom of the device enables the animals therein to consume the said green stuff, whereupon the device is moved to another position offering a fresh supply of growing food.

It is desired that rabbits and cavies be also supplied with cured food such as alfalfa hay. This is supplied in the present case by filling hopper 12 with the same. On account of the screened bottom of hopper 12 the cured food is always accessible to the animals and yet is kept up out of the way and therefore maintained in a sanitary condition.

The compartment 9 affords a convenient place for building nests and is a dry and warm place during inclement weather, the lath floor being sufficiently open for sanitary purposes and yet provides a dry place for the animals.

The invention herein set forth effectually prevents all drafts from reaching the animals therein, and is sanitary because it is thoroughly cleaned merely by removing it from one position to another and because nearly all of it is open to the sunlight at all times. Furthermore it affords a more natural method of living for the animals since they are not raised up a distance from the ground as is now usually the case.

While I have herein shown and described one particular embodiment of my invention, it is to be understood that changes in form, proportions, and details of construction may be made within the scope of the appended claims.

I claim:

1. In a device of the character described, a housing having an open top, a hopper hinged to the housing and adapted to form a closure for the top thereof, and a wire mesh bottom for said hopper.

2. In a device of the character described, a housing having an open top, a hopper hinged to the housing and adapted to form a closure for the top thereof, and a removable top and a wire mesh bottom for said hopper.

JOHN F. McKIM.